United States Patent
Lin et al.

(10) Patent No.: US 9,051,624 B2
(45) Date of Patent: Jun. 9, 2015

(54) METHOD OF WASHING ANODE SLIME FROM LEAD-BISMUTH ALLOY ELECTROLYSIS

(75) Inventors: Guorong Lin, Jiangxi (CN); Huanrong Yu, Jiangxi (CN); Jihong Li, Jiangxi (CN)

(73) Assignee: Jiangxi Rare Earth and Rare Metals Tungsten Group Holding Co., Ltd., Jiangxi (CN)

( * ) Notice: Subject to any disclaimer, the term of this patent is extended or adjusted under 35 U.S.C. 154(b) by 661 days.

(21) Appl. No.: 13/511,782

(22) PCT Filed: Dec. 30, 2009

(86) PCT No.: PCT/CN2009/076294
§ 371 (c)(1),
(2), (4) Date: Jun. 18, 2012

(87) PCT Pub. No.: WO2011/063577
PCT Pub. Date: Jun. 3, 2011

(65) Prior Publication Data
US 2012/0247509 A1  Oct. 4, 2012

(30) Foreign Application Priority Data
Nov. 24, 2009 (CN) .......................... 2009 1 0238049

(51) Int. Cl.
*B08B 7/04* (2006.01)
*C22B 7/00* (2006.01)
(Continued)

(52) U.S. Cl.
CPC . *C22B 7/006* (2013.01); *B08B 3/00* (2013.01); *B08B 3/04* (2013.01); *B08B 3/14* (2013.01);
(Continued)

(58) Field of Classification Search
CPC .............. B08B 3/00; B08B 3/14; B08B 7/04; C01G 21/006; C22B 7/007; C22B 7/006; C22B 30/06; C22B 13/045; C24C 1/18; C25C 3/34
See application file for complete search history.

(56) References Cited

U.S. PATENT DOCUMENTS 4,026,776 A * 5/1977 Hirakawa et al. ............. 205/563
4,352,786 A  10/1982 Hoh et al.
(Continued)

FOREIGN PATENT DOCUMENTS

| CN | 1772957 A | 5/2006 |
|---|---|---|
| CN | 101713028 A | 5/2010 |

(Continued)

*Primary Examiner* — Bibi Carrillo
(74) *Attorney, Agent, or Firm* — Hammer & Associates, P.C.

(57) ABSTRACT

A method of washing anode slime from lead-bismuth alloy electrolysis is disclosed, wherein a lead fluorosilicate solution with high concentration can be obtained by using the anode slime from lead-bismuth alloy electrolysis as raw material, which is characterized in that the method includes the following steps: (1) pretreating the anode slime, (2) primarily soaking the anode slime, (3) secondarily soaking the anode slime. A method of washing anode slime from lead-bismuth alloy electrolysis, and obtaining a soaking solution containing a lot of lead ions and fluorosilicic anions is provided. The soaking supernatant is added directly into the electrolyte-circulating system of lead-bismuth alloy electrolysis, which increases the utilization rate of lead ions and fluorosilicic anions, and improves the environment for smelting bismuth and silver, while reduces production cost for smelting lead, bismuth and silver. The method optimizes the process for the lead-bismuth alloy electrolysis, and solves the problem of "lean-lead" in the lead-bismuth alloy electrolysis.

5 Claims, 3 Drawing Sheets

(51) Int. Cl.
  *C22B 3/00* (2006.01)
  *C22B 30/06* (2006.01)
  *C25C 1/18* (2006.01)
  *C25C 7/06* (2006.01)
  *B08B 3/00* (2006.01)
  *B08B 3/04* (2006.01)
  *B08B 3/14* (2006.01)
  *C01G 21/00* (2006.01)
  *C25C 3/34* (2006.01)

(52) U.S. Cl.
  CPC .............. *B08B 7/04* (2013.01); *C01G 21/006* (2013.01); *C22B 7/007* (2013.01); *C25C 3/34* (2013.01); *C22B 13/045* (2013.01); *C22B 30/06* (2013.01); *C25C 1/18* (2013.01); *C25C 7/06* (2013.01)

(56) References Cited

U.S. PATENT DOCUMENTS

| | | | |
|---|---|---|---|
| 4,500,398 A | | 2/1985 | Cole, Jr. et al. |
| 5,135,624 A | * | 8/1992 | Tan et al. ............. 205/350 |
| 2014/0008238 A1 | * | 1/2014 | Zhou et al. ............ 205/367 |

FOREIGN PATENT DOCUMENTS

| | | |
|---|---|---|
| JP | 5247552 A | 9/1993 |
| JP | 5311259 A | 11/1993 |

* cited by examiner

METHOD OF WASHING ANODE SLIME FROM LEAD-BISMUTH ALLOY ELECTROLYSIS

CROSS-REFERENCE TO RELATED APPLICATIONS

This application is a 371 of PCT/CN09/76294, filed Dec. 30, 2009.

TECHNICAL FIELD

The present invention relates to a method of washing anode slime from lead-bismuth alloy electrolysis, particularly to a method for processing anode slimes in lead-bismuth alloy electrolysis to recover metal ions.

In this patent specification, the term "lead-bismuth alloy" is a material produced in fire smelting which is composed of lead and bismuth as main elements and has general characteristics of a metal.

The term "supernatant liquor" is the clarified solution from the first or the second immersing liquor (or called primary soaking solution or secondarily soaking solution).

The term "precipitated lead" refers to the substances precipitated from cathodes in lead-bismuth alloy electrolysis.

The term "lean lead" means that lead ions are below a minimum value of 50 g/L that is required for maintenance of normal electrolysis in a circulating system of lead-bismuth alloy electrolysis.

BACKGROUND OF INVENTION

In the electrolysis of lead-bismuth alloy, insoluble ingredients of the anodes settle to the bottom of the electrolyzer as anode slimes. When anodes are replaced, anode slimes are recycled from the electrolyzer. In electrolysis, base metals with relatively negative potential enter into the solution, whereas noble metals, scarce metals (such as selenium, tellurium, bismuth, etc.), anode powders and the like form insoluble anode slimes. The composition and yield of the anode slimes are mainly related to anode composition, ingot quality and electrolytic conditions.

The yield of anode slimes is generally 0.2-1%, the main components are as follows, Cu: 10-35%; Ag: 1-28%; Au: 0.1-0.5%; Se: 2-23%; Te: 0.5-8%; S: 2-10%; Pb: 1-25%; Ni: 0.1-15%; Sb: 0.1-10%; As: 0.1-5%; Bi: 0.1-1%; trace platinum family metals; and $H_2O$: 25-40%. Platinum group metals, gold, most of copper and a small amount of silver are present in metallic state; while selenium, tellurium, most of silver and a small amount of copper and gold are present as metal selenides and tellurides, such as $Ag_2Se$, $Ag_2Te$, $CuAgSe$, $Au_2Te$ and $Cu_2Se$; and a small amount of silver and copper is present as $AgCl$, $Cu_2S$ and $Cu_2O$. The remaining metals are mostly present as oxides, complex oxides, or arsenates or antimonates.

Anode slime processing mainly involves two categories, i.e. fire method and wet method. The fire method involves calcining lead anode slimes at high temperatures followed by electrolytic preparation. The wet method involves solution extraction and separation.

In the process of high lead-bismuth-silver alloy electrolysis, as thickness of the anode slimes increases rapidly, serious problems of rich lead and lean lead arise inside and outside the anode slimes of the anode, respectively, followed by problems such as decreasing of lead ions, rising of cell voltage and precipitating of impurities, all of which affect the normal operation of electrolysis and quality of the products. Thus, it is necessary to add a lot of yellow lead to the electrolytic system to increase the content of lead ions, in order to solve the problem of "lean lead" in electrolysis. With the smelting of anode slimes, the rich leads inside the anode slimes move on to bismuth-silver smelting Section, which greatly extends the cycle of oxidation refining of the silver smelting section and increases the amount of early slags.

SUMMARY OF THE INVENTION

An object of this invention is to provide a method for washing anode slimes in lead-bismuth alloy electrolysis to obtain a large amount of lead and fluorosilicate ions, thus optimizing process and solving the problem of "lean lead" in lead-bismuth alloy electrolysis.

The present invention provides a method for washing anode slimes in lead-bismuth alloy electrolysis, which uses anode slimes in lead-bismuth alloy electrolysis as raw materials to obtain lead fluorosilicate solution with high concentration, characterized by the following steps: (1) Pre-treatment of the anode slimes; (2) first immersion of the anode slimes; and (3) second immersion of the anode slimes.

The pretreatment of anode slimes is to separate the anode slimes from the remaining anode plates before the anode slimes are weathered and make them into powdery anode slimes. For example, in the step of pre-treating anode slimes, the anode slimes on the anode plates are first broken by means of an iron bar, and then the broken anode slimes are shoveled off by a long handled shovel, and the sheet-like anode slimes are pounded and pulverized.

In the first immersion of anode slimes, the immersing agent may be purified water or the supernatant liquor of the second immersion. In the process of immersing anode slimes, immersing temperature is 30-50° C., the amount of immersing agent used is 0.2-0.4 $m^3$ per ton of wet anode slimes. After stirring & immersing for 1-2 h, anode slimes from the first immersion are left in the immersing pool. The first immersing liquor is added directly to the circulating electrolyte of lead-bismuth alloy electrolysis, and the first settlings or precipitations are returned to the immersing pool containing the anode slimes from the first immersion to be ready for the second immersion. Preferably, in the process of immersing anode slimes, immersing temperature is 45° C., and the amount of immersing agent used is 0.2-0.25 $m^3$ per ton of wet anode slimes. Stirring & immersing is carried out for 1.5 h.

In the second immersion of anode slimes, the immersing agent is a dilute solution of fluorosilicic acid of pH3-5. In the process of immersing anode slimes, immersing temperature is 30-50° C., the amount of immersing agent used is 0.2-0.4 $m^3$ per ton of wet anode slimes. After immersing for 0.5-2 h, the second immersing liquor can be added directly to the circulating electrolyte of lead-bismuth alloy electrolysis, or used as the immersing agent for the first immersion. The anode slimes from the second immersion and the second settlings or precipitations are weathered for 12 h, and then enter into bismuth-silver smelting section.

Preferably, in the process of immersing anode slimes, the immersing agent is a dilute solution of fluorosilicic acid of pH4, immersing temperature is 45° C., the amount of immersing agent used is 0.2-0.25 $m^3$ per ton of wet anode slimes. Stirring & immersing is carried out for 1 h.

The first immersion and the second immersion of anode slimes can be carried out in different immersing pools. Preferably, immersions are carried out in the same immersing pool.

Anode slimes in lead-bismuth alloy electrolysis are used as raw materials in the present invention. Anode slimes are pounded and pulverized into powdery anode slimes. A large amount of lead ions and fluorosilicic anions are obtained from the second immersion. Addition of the supernatant liquor of the first immersion, which contains a large amount of ions, and part of the supernatant liquor of the second immersion to a circulating electrolyte of lead-bismuth alloy electrolysis increases utilization rate of lead ions and fluorosilicic anions, improves condition for smelting bismuth-silver, and reduces production costs for smelting lead, bismuth and silver. Process optimization is achieved in the present invention, and the phenomenon of "lean lead" is alleviated.

Also stated as—A method for washing anode slimes in lead-bismuth alloy electrolysis, using anode slimes in lead-bismuth alloy electrolysis as raw materials to obtain a lead fluorosilicate solution with high concentration, characterized by the following steps: (1) pre-treatment of the anode slimes; (2) first immersion of the anode slimes; and (3) second immersion of the anode slimes. The present invention provides a method for washing anode slimes in lead-bismuth alloy electrolysis to obtain an immersing liquor with a large amount of lead ions and fluorosilicic anions. The supernatant liquor is directly added into the circulating electrolyte of lead-bismuth alloy electrolysis, so as to increase utilization rate of lead and fluorosilicate ions, improve environment for smelting bismuth-silver, and reduce production cost for smelting lead, bismuth and silver. In the present invention, the process of lead-bismuth alloy electrolysis is optimized, and the problem of "lean lead" in lead-bismuth alloy electrolysis is also solved.

BRIEF DESCRIPTION OF ACCOMPANYING DRAWINGS

SPECIFIC EMBODIMENTS

Example 1

Figure 1:
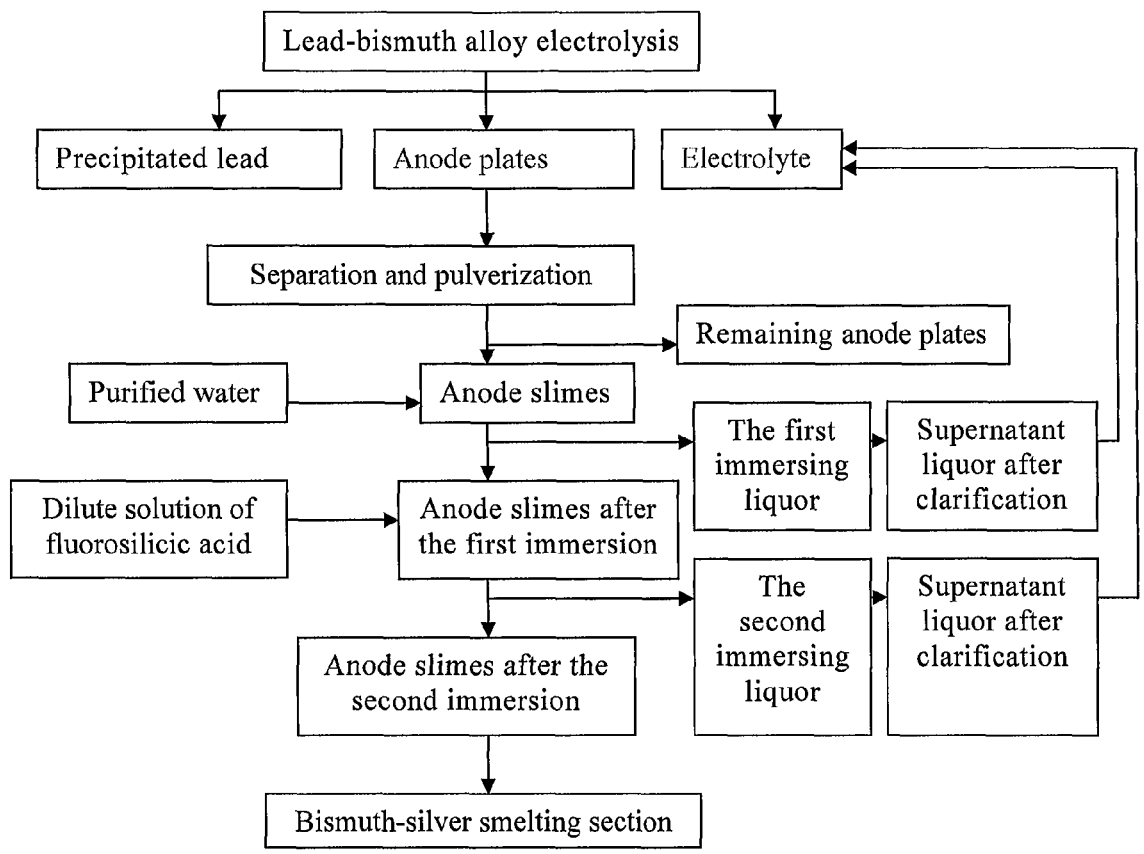
FIG. 1 is a flow diagram of a process for washing anode slimes in lead-bismuth alloy electrolysis according to the present invention.
Figure 2:
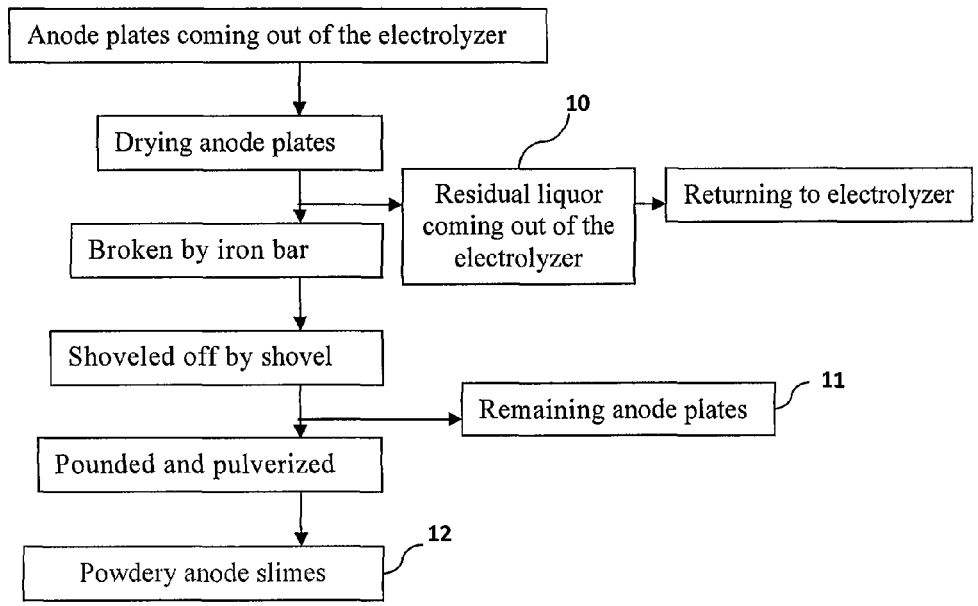
FIG. 2 is a flow diagram of the pre-treatment of the anode slimes according to the process of the present invention for washing anode slimes in lead-bismuth alloy electrolysis.
Figure 3:
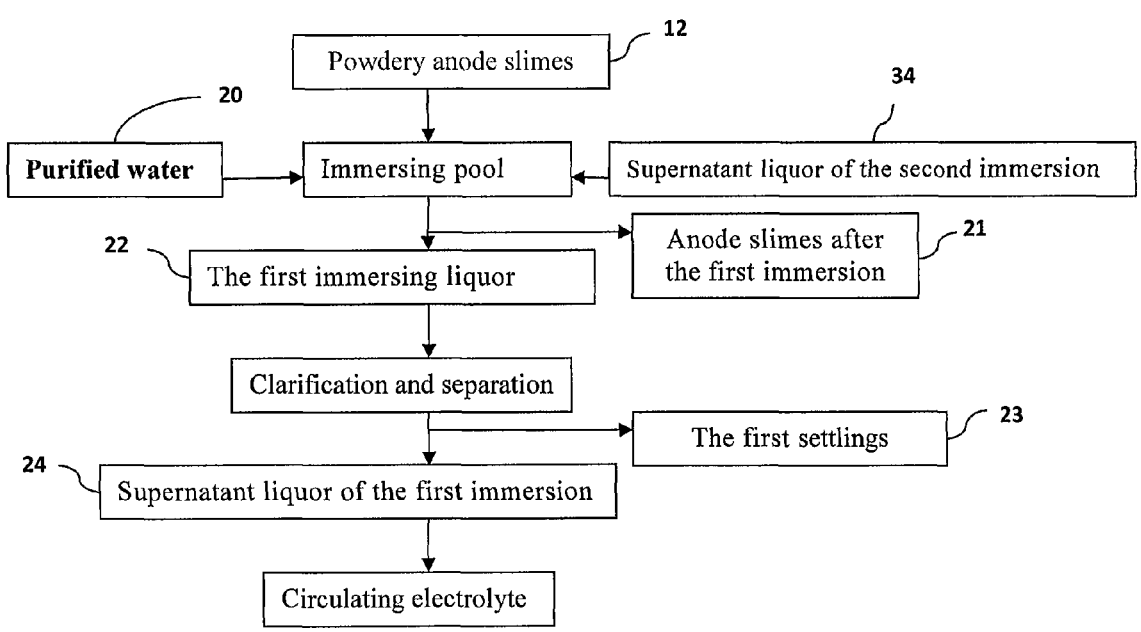
FIG. 3 is a flow diagram of the first immersion of the anode slimes according to the process of the present invention for washing anode slimes in lead-bismuth alloy electrolysis.
Figure 4:
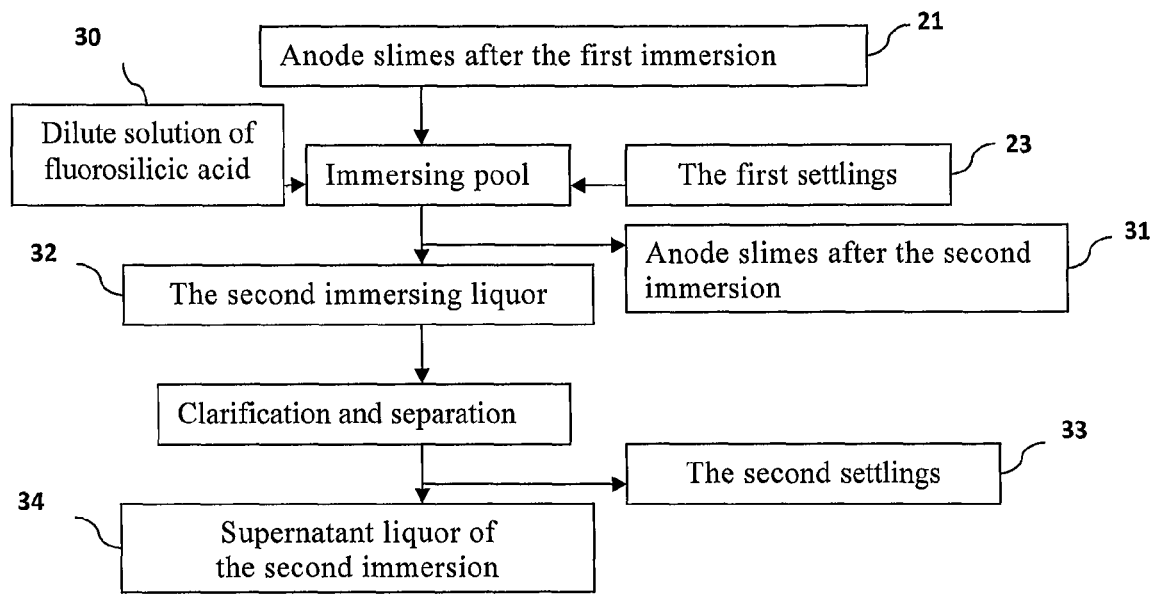
FIG. 4 is a flow diagram of the second immersion of the anode slimes according to the process of the present invention for washing anode slimes in lead-bismuth alloy electrolysis.

As shown in FIG. 1, a process of the present invention is illustrated for washing anode slimes in lead-bismuth alloy electrolysis, wherein anode slimes in lead-bismuth alloy electrolysis are used as raw materials. The main steps include:

I. Pre-Treatment of the Anode Slimes

After 72-96 h of electrolysis cycle, anode slimes with precipitated lead and anode plates are produced. The anode plates are transferred from the electrolyzer by a moving crane to a place where anode plates are stacked and dried; residual liquor 10 coming out of the electrolyzer is recycled, clarified, and then returned to the electrolyzer. The anode slimes on the anode plates are broken by an iron bar, the anode slimes are shoveled off by a long handled shovel, pounded and pulverized into powdery anode slimes 12. Remaining or residual anode plates 11 which have been fully treated are returned to anode pot for smelting.

II. First Immersion of the Anode Slimes

The immersing agent, i.e. purified water 20 or the supernatant liquor 34 of the second immersion, is injected into the immersing pool containing the powdery anode slimes 12, in the immersing pool, the temperature is 30-50° C., the amount of immersing agent used is 0.2-0.4 $m^3$ per ton of wet anode slimes. After stirring & immersing for 1-2 h, anode slimes 21 from the first immersion are left in the immersing pool. The first immersing liquor 22 is pumped out to a storage tank to be clarified. The supernatant liquor 24 of the first immersion is separated, and the supernatant liquor 24 of the first immersion is pumped into the circulating electrolyte or stored. The first settlings or precipitations 23 are returned to the immersing pool containing the anode slimes 21 from the first immersion to be ready for the second immersion.

III. Second Immersion of the Anode Slimes

The dilute solution 30 of fluorosilicic acid of pH 3-5 is added to the immersing pool containing the anode slimes 21 from the first immersion and the first settlings 23. In the immersing pool, the temperature is 30-50° C., the amount of immersing agent used is 0.2-0.4 $m^3$ per ton of wet anode slimes. After immersing for 0.5-2 h, the second immersing liquor 32 is pumped out to a storage tank to be clarified. The supernatant liquor 34 of the second immersion is separated, and the supernatant liquor 34 of the second immersion is used as a supplement for the circulating electrolyte, or used as the first immersing agent to be used for the next time. The anode slimes 31 from the second immersion and the second settlings or precipitations 33 are weathered for 12 h, and then are entered into bismuth-silver smelting section.

Example 2

As shown in FIG. 1, a process is illustrated for washing anode slimes in lead-bismuth alloy electrolysis, wherein anode slimes in lead-bismuth alloy electrolysis are used as raw materials. The main steps include:

I. Pre-Treatment of the Anode Slimes

After 72-96 h of electrolysis cycle, anode slimes with precipitated lead and anode plates are produced. The anode plates are transferred from the electrolyzer by a moving crane to a place where anode plates are stacked and dried, residual liquor 10 coming out of the electrolyzer is recycled, clarified, and then returned to the electrolyzer. The anode slimes on the anode plates are broken by an iron bar, the anode slimes are shoveled off by a long handled shovel, pounded and pulverized into powdery anode slimes 12. Remaining anode plates 11 which have been fully treated are returned to anode pot for smelting.

II. First Immersion of the Anode Slimes

The immersing agent, i.e. purified water 20 or the supernatant liquor 34 of the second immersion, is injected into the immersing pool containing the powdery anode slimes 12, the temperature is 45° C., and the amount of immersing agent used is 0.2-0.25 $m^3$ per ton of wet anode slimes. After stirring & immersing for 1.5 h, anode slimes 21 from the first immersion are left in the immersing pool. The first immersing liquor 22 is pumped out to a storage tank and clarified. The supernatant liquor 24 of the first immersion is separated, and the supernatant liquor 24 of the first immersion is pumped into the circulating electrolyte or stored. The first settlings 23 are returned to the immersing pool containing the anode slimes 21 from the first immersion to be ready for the second immersion.

III. Second Immersion of the Anode Slimes

The dilute solution 30 of fluorosilicic acid of pH 4 is added to the immersing pool containing the anode slimes 21 from the first immersion and the first settlings 23. The temperature is 45° C., and the amount of immersing agent used is 0.2-0.25 m³ per ton of wet anode slimes. After immersing preferably for 1 h, the second immersing liquor 32 is pumped out to a storage tank and clarified. The supernatant liquor 34 of the second immersion is separated, and the supernatant liquor 34 of the second immersion is used as a supplement for the circulating electrolyte, or used as the first immersing agent to be used for the next time. The anode slimes 31 from the second immersion and the second settlings 33 are weathered for 12 h, and then are entered into bismuth-silver smelting section.

The data in table 1 show the comparison of the effects where the anode slimes in bismuth alloy electrolysis are washed by the process of the present invention or not.

The data in table 2 show the effects where the immersing liquor of the process of the present invention is used as a supplement for the circulating electrolyte.

TABLE 1

The effects of immersion on anode slimes (%) or not

| Group# | anode slimes | Bi | Ag | Pb |
|---|---|---|---|---|
| 1 | | 70.62 | 2.120 | 17.48 |
| 2 | | 69.81 | 2.021 | 18.24 |
| 3 | Not Immersed | 69.20 | 2.032 | 19.12 |
| 4 | | 67.25 | 1.905 | 19.88 |
| 5 | | 70.55 | 2.066 | 17.43 |
| 6 | | 75.71 | 2.311 | 12.40 |
| 7 | | 77.67 | 2.393 | 10.90 |
| 8 | Immersed | 75.55 | 2.348 | 12.51 |
| 9 | | 75.51 | 2.361 | 11.65 |
| 10 | | 74.21 | 2.247 | 12.51 |

TABLE 2

Composition of the immersing liquors

| | The first immersing liquor (Kg/m³) | | | The second immersing liquor (Kg/m³) |
|---|---|---|---|---|
| Times | C (Pb²⁺) | C (total Acids) | C (free Acids) | C(Pb²⁺) |
| 1 | 346.53 | 167.34 | 15.03 | 100.09 |
| 2 | 270.86 | 153.73 | 12.30 | 123.54 |
| 3 | 252.29 | 140.06 | 10.89 | 108.33 |
| 4 | 306.89 | 134.65 | 9.06 | 104.85 |

The invention claimed is:

1. A method for washing anode slime from a lead-bismuth alloy electrolysis comprising the steps of:

(1) pre-treating the anode slime by drying an anode plate, separating the anode slime from the anode plate before weathering, and pulverizing the anode slime into a powder;

(2) first immersing of the anode slime by injecting a first immersing agent onto the powdery anode slime, the first immersing agent being purified water, stirring the immersed anode slime for 1-2 hours, clarifying a first supernatant liquor from the first immersion and returning any settling to the anode slime;

(3) second immersing of the anode slime for 0.5-2 hours by adding a second immersion agent of a dilute solution of fluorosilicic acid to the anode slime and settling, and clarifying a second supernatant liquor from the second immersion, immersing temperatures of the first immersion and the second immersion being 30-50° C., and amounts of immersing agents in the first immersion and the second immersion being 0.2-0.4 m³ per ton of wet anode slime;

wherein the first liquor and a portion of the second liquor are added to a circulating electrolyte of the lead-bismuth alloy electrolysis.

2. The method for washing anode slimes from lead-bismuth alloy electrolysis according to claim 1, characterized by said dilute solution of fluorosilicic acid having a pH in the range of 3-5.

3. The method for washing anode slimes from lead-bismuth alloy electrolysis according to claim 1, characterized by the immersing temperatures of the first immersion and the second immersion being 45° C.

4. The method for washing anode slimes from lead-bismuth alloy electrolysis according to claim 1, characterized by the first immersion and the second immersion being carried out in a single immersing pool.

5. The method for washing anode slimes from lead-bismuth alloy electrolysis according to claim 2, characterized by said dilute solution of fluorosilicic acid having a pH of 4.

* * * * *